United States Patent
Woods et al.

(10) Patent No.: US 10,384,506 B1
(45) Date of Patent: Aug. 20, 2019

(54) ROD-LOCK ENABLE AIR BAG LIFTING SYSTEM

(71) Applicant: Amazon Technologies, Inc., Seattle, WA (US)

(72) Inventors: David Lyle Woods, Concord, NH (US); Jon Joseph Varteresian, Hubbardston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 15/607,034

(22) Filed: May 26, 2017

(51) Int. Cl.
| | |
|---|---|
| *B66F 3/35* | (2006.01) |
| *B60G 11/27* | (2006.01) |
| *B60G 11/28* | (2006.01) |
| *B66F 7/08* | (2006.01) |
| *B60G 11/26* | (2006.01) |

(52) U.S. Cl.
CPC .............. *B60G 11/27* (2013.01); *B60G 11/28* (2013.01); *B66F 3/35* (2013.01); *B66F 7/08* (2013.01); *B60G 11/26* (2013.01); *B60G 2202/10* (2013.01); *B60G 2202/15* (2013.01); *B60G 2202/152* (2013.01); *B60G 2204/10* (2013.01); *B60G 2204/12* (2013.01); *B60G 2204/126* (2013.01)

(58) Field of Classification Search
CPC ............... B66F 3/35; B66F 7/08; B66F 7/085
See application file for complete search history.

(56) References Cited

U.S. PATENT DOCUMENTS

| | | | | |
|---|---|---|---|---|
| 3,719,299 | A * | 3/1973 | Oehler | B60P 1/6427 254/93 HP |
| 4,323,141 | A * | 4/1982 | Ragan | B66F 7/26 187/204 |
| 4,605,203 | A * | 8/1986 | Hooper | F15B 15/10 254/93 H |
| 4,943,204 | A * | 7/1990 | Ehrlich | B60P 1/02 187/211 |
| 4,977,999 | A * | 12/1990 | Smock | B65G 1/08 193/35 SS |
| 5,915,913 | A * | 6/1999 | Greenlaw | B61D 47/00 187/267 |
| 6,637,561 | B1 * | 10/2003 | Collins | B60G 13/16 188/380 |
| 7,416,378 | B1 * | 8/2008 | Adams | B60P 1/6445 254/93 HP |
| 7,665,788 | B2 * | 2/2010 | Dibdin | B60P 1/02 296/25 |

(Continued)

*Primary Examiner* — Kevin Hurley
*Assistant Examiner* — Michael R Stabley
(74) *Attorney, Agent, or Firm* — Kilpatrick Townsend & Stockton LLP (57) ABSTRACT

An air bag based lifting apparatus can include a platform, a stabilizing mechanism for retaining the platform in a horizontal orientation, an air bag column connected with the platform and configured to retain a vertical rod passing through or adjacent the air bag column, and a rod lock connected with the platform and operable to secure the platform in a vertical position when locked. First and second valves can connect the air bag column and rod lock with a pressure source, and can be actuated in order to lift, lower, or support the platform. In the event of depressurization, the rod lock can lock to the vertical rod and support the platform.

21 Claims, 7 Drawing Sheets

(56) References Cited

U.S. PATENT DOCUMENTS

| | | | | |
|---|---|---|---|---|
| 8,052,120 B2* | 11/2011 | Bacon | ............ | B66F 7/0625 |
| | | | | 180/168 |
| 9,975,747 B1* | 5/2018 | Williams | ............ | B66F 3/35 |
| 2003/0133774 A1* | 7/2003 | Dibdin | ............ | B60P 1/02 |
| | | | | 414/373 |
| 2008/0001130 A1* | 1/2008 | Dibdin | ............ | B60P 1/02 |
| | | | | 254/93 HP |

* cited by examiner

ROD-LOCK ENABLE AIR BAG LIFTING SYSTEM

BACKGROUND

Air bag-based suspension and leveling mechanisms are used in the commercial trucking industry for applications in leveling loads (e.g., trailer loads) and in suspension systems. Such systems take the form of, for example, air springs, which include an inflatable high-strength bag which can be supplied with air from a pressurized gas source like an air braking system. Air bag-based leveling systems allow a user to stiffen individual air springs or sets of air springs to provide lifting power, typically for aligning a towing apparatus with a trailer or the like. Air bag suspension systems replace or work in concert with conventional mechanical spring, pneumatic, or hydraulic systems. Advantages of air bag suspension systems include the capability to raise or lower portions of a vehicle in order to level a loaded vehicle, to load or unload cargo, to distribute load across the axles, and to provide a smoother ride. Air bag suspension systems have been shown to be powerful and cost-effective tools for adjusting and for supporting vehicle loads. However, existing air bag lifting systems are typically used only for applications involving limited range of motion, and are prone to sudden failure under loss of pressure conditions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein disclosed relate to air bag-based lifting systems and methods that include a pneumatically actuated rod lock. The air bag lifting system includes an air bag assembly and rod lock that are both connected with a platform. The air bag assembly is typically positioned between the platform and a base, and is operable to actuate when filled with high pressure gas or air in order to lift or support the platform. In some embodiments, the air bag assembly is an air bag column including two or more air bags arranged vertically in series and connected with one another. The rod lock is connected with the platform and operably connected with a vertical rod that runs either through or adjacent to the platform, such that the rod lock can lock the platform in position relative to the rod. The rod lock is preferably a pneumatic rod lock having a clamping mechanism that opens when placed under pneumatic load, and that closes automatically under low pressure conditions. Both the air bag assembly and the rod lock are disposed around the vertical rod, the rod passing through a clamping mechanism in the rod lock, and passing through an annular central portion of each air bag in the air bag assembly. The arrangement of the vertical rod through the air bag assembly serves to align the air bags with each other, helping to retain the air bags in a vertical column at both high and low extensions.

When the air bag assembly is inflated, each air bag in the air bag column inflates, causing the entire air bag assembly to extend upward along the vertical rod. The air bag assembly can exert upward force on the platform, causing the platform and any retained payload to be lifted. The height to which the platform is lifted is dependent on the quantity and pressure of gas added to the air bag assembly. Simultaneously and separately, the rod lock is pressurized, causing the clamping mechanism of the rod lock to release the rod, allowing the platform to travel. Conversely, when the air bag assembly is deflated under controlled conditions, the upward pressure exerted by the air bag column decreases, and the platform lowers under the force of gravity. The rod lock remains pressurized throughout the lowering process as well, allowing the platform to travel.

In some alternative embodiments, a hydraulic fluid may be substituted for gas, and the air bag assembly and/or rod lock adapted to employ hydraulic fluid. A hydraulic fluid-based system can be assembled in similar manner to the pneumatic systems described herein, though such systems may additionally employ auxiliary connections for returning discharged hydraulic fluid to a fluid reservoir, whereas pneumatic systems can generally vent pressure to the atmosphere.

The platform can be locked in position when it has reached a preferred height or when a the system receives a user command by triggering a pressure release from the rod lock. In some cases, the pressure can be released at the rod lock by actuating a rod lock valve in order to disconnect the rod lock from a pressurized gas source and vent to the environment. This procedure may be performed while the air bag assembly remains pressurized, or may be performed simultaneously with closing off an air bag assembly valve in order to cease pressurizing the air bag column. In some other cases, the pressure may be released from the rod lock at the pressurized gas source. Further, if the pressure is released simultaneously from both the rod lock and the air bag assembly, the rod lock clamp can immediately close on the rod, causing the system to retain the platform even in the event of sudden failure at the pressurized gas source.

According to some embodiments, the platform can be leveled and supported against horizontal force by a stabilizing assembly. The stabilizing assembly can include one or more scissor-type assemblies that work to retain the platform in a horizontal alignment and to support the platform against horizontal force. In some cases, the stabilizing assembly can include one or more additional vertical support members, with sliding elements connected to the platform and operable to slide on the vertical support member(s) in order to align the platform and provide support against horizontal force while permitting the platform to move vertically.

Embodiments of the disclosure are shown in greater detail with reference to the following figures.

Figure 1:
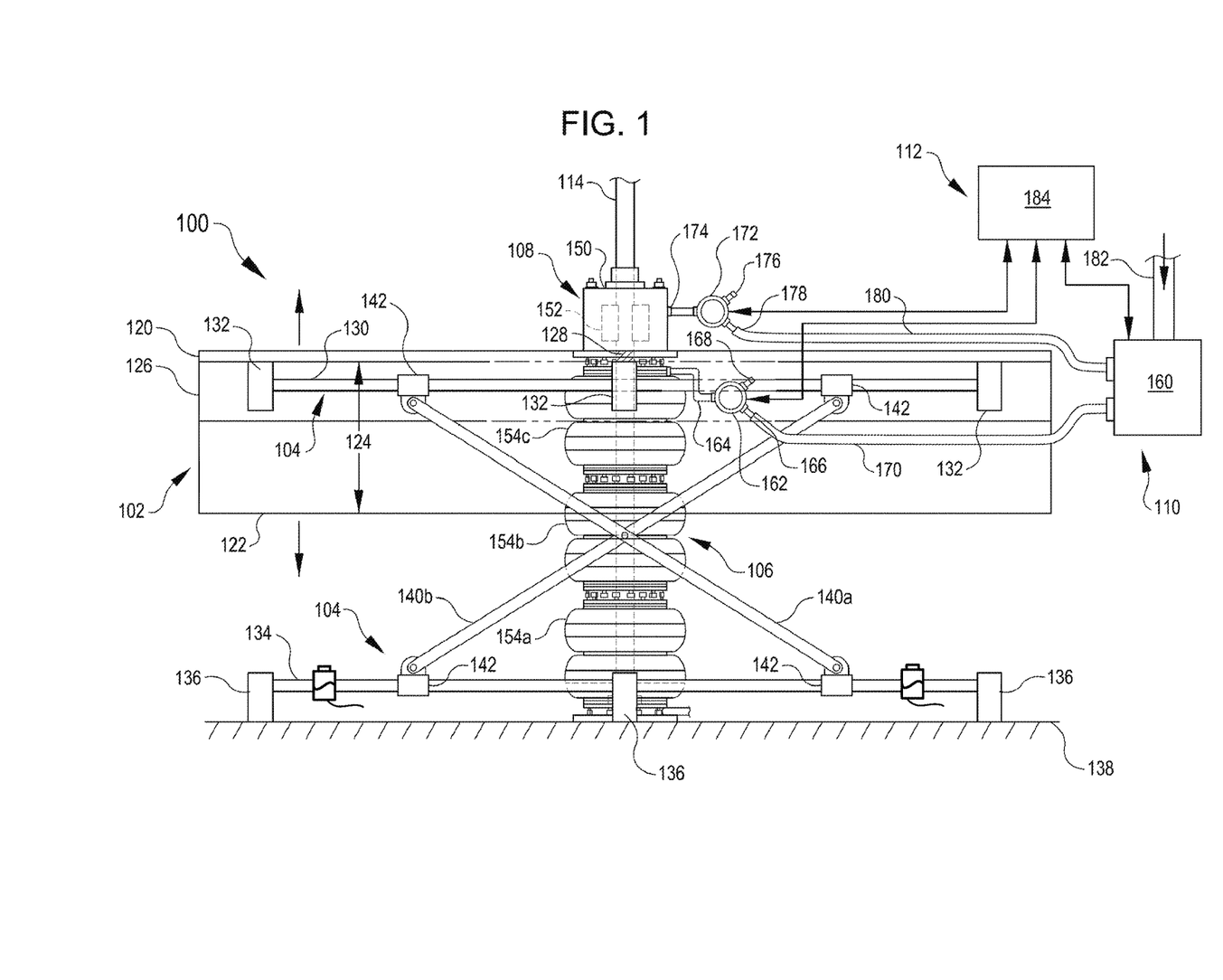
FIG. 1 shows an example air bag lifting system in a side view, in accordance with embodiments.

FIG. 1 shows an example air bag lifting system 100 in a side view, in accordance with embodiments. The system 100 includes a platform 102 for holding and lifting a payload. A stabilizing assembly 104 is connected with the platform 102 for stabilizing the platform in operation, which can include keeping the platform level and resisting horizontal movement of the platform. An air bag column 106 is operably connected with the platform 102, typically below a portion of the platform, and operable to lift and lower the platform by expanding and contracting. A rod lock assembly 108 is also operably connected with the platform 102, as well as with a vertical rod 114, and is operable to clamp to the rod in order to secure the platform against vertical motion when locked, and allow free motion up and down the rod when unlocked. A pneumatic system 110 provides pressurized gas, e.g. air, for use in both the air bag column 106 and at the rod lock assembly 108, the pressurized gas being both the driving fluid for pressurizing and actuating the air bag column and the operating fluid for releasing the rod lock assembly. A control system 112 is operably connected with the air bag column 106 and with the rod lock assembly 108, and is operable to direct the pressurized gas in order to raise and lower the platform 102, and in order to lock or unlock the rod lock assembly.

The platform 102 includes a working portion 120 which structurally supports the platform and connects with the rod lock 108 and air bag column 106. The working portion 120 connects with a platform bed 122 which is arranged for supporting a load. In some embodiments, the platform bed 122 is sized and shaped to hold a heavy mechanical device in order to allow a technician to lift and service the device. In terms of scale, it is anticipated that the platform bed 122 may be sized to support an industrial robot, vehicle, or other cargo, and may extend downward by a vertical clearance 124 sufficient to allow the platform bed to rest on a base 138 when the platform 102 is positioned at a minimum height, so that a robot, vehicle, or any wheeled carrier for cargo can be driven directly onto the platform bed. The base 138 can be any suitable support structure for anchoring or supporting the lifting system such as a lower platform, footing, scaffold, or a floor.

The platform 102 is connected with a stabilizing assembly, such as the stabilizing assembly 104, for stabilizing the platform against horizontal force and for retaining the platform in a horizontal orientation. Suitable stabilizing assemblies can include scissor-type assemblies, linear bearing assemblies having one, two, or more vertical supports running in parallel, or any other suitable form of stabilizing assembly. In the embodiment shown in FIG. 1, the stabilizing assembly 104 includes a scissor-type arrangement of support members 140a, 140b (cumulatively 140). Although only one pair of support members 140 is shown, a stabilizing assembly can include multiple sets of support members positioned about the platform 102. For the scissor-type arrangement shown in FIG. 1, the stabilizing assembly 104 includes an upper stabilizing rail 130 connected with the platform 102 and a lower stabilizing rail 134 connected with the base 138, or other lower surface relative to which the platform 102 is configured to move. The upper stabilizing rail 130 is connected with the working portion 120, e.g. via a platform body flange 126 and upper rail connective elements 132; and similarly, the lower stabilizing rail 134 can be connected with the base 138 via additional lower rail connective elements 136. Each of the support members 140 is connected at its respective ends to both stabilizing rails 130, 134 via linear bearings 142 that permit the support members 140 to scissor, thus retaining the horizontal orientation of the platform 102 while allowing the platform to move vertically. In various alternative embodiments, a scissor-type assembly may incorporate wheeled elements in tracks; one or more of the support members 140 may be pinned in place at an end; or multiple layers of scissoring assemblies may be stacked on top of one another. A scissor-type assembly may, in some embodiments, be replaced with a linear assembly as described below with reference to FIG. 4.

The platform 102 is connected with the rod lock assembly 108, which is operably connected with the vertical rail 114. The rod lock assembly 108 includes a casing 150 and a clamping element 152 within the casing and operable to clamp the rod lock assembly to the vertical rail 114 with sufficient force to prevent vertical sliding of the rod lock assembly even against substantial external force. The rod lock assembly 108, when installed, operates by releasing the rod 114 when subjected to pneumatic pressure above a predetermined lower limit, and locking to the rod when in a low pressure state. Suitable rod lock assemblies are commercially available from SMC Pneumatics as Part No.: CLSB125TN-KT-DUU02043 (SMC Inc., Tokyo, Japan). In specific embodiments, the rod lock assembly is configured to release the rod when subjected to a pneumatic pressure of at least 80 kPa, or preferably between 80 kPa and 300 MPa. According to some embodiments, the rod lock assembly 108 is operable to support a total vertical force of at least 29.5 kN, or in some specific embodiments, at least 0 kN, or up to 29.5 kN.

According to some embodiments, the rod lock casing 150 is connected with and on top of the working portion 120; however, in alternative embodiments, the rod lock casing can be positioned below, or integrated with, the platform body. According to some embodiments, the rod 114 passes through a void 128 in the working portion 120 and also through the clamping element 152 of the rod lock assembly 108. However, according to alternative embodiments, the rod 114 can pass adjacent to the working portion 120, with the rod lock assembly 108 being connected with the platform body and extending outward to connect with the rod.

The platform 102 is also connected with the air bag column 106, with the air bag column 106 positioned below the working portion 120 and operable to support the platform 102 from beneath. The air bag column 106 includes a series of air bag elements 154a-c (cumulatively 154), each of which is capable of inflating with pressurized gas so that the elements expand in a vertical direction with sufficient force to raise a load. Each air bag element 154 of the air bag column 106 includes a high-strength, pliable material formed in a roughly toroidal shape and capable of retaining pressurized gas. Each air bag element 154 is positioned annularly around the rod 114, so that any expansion of the element is constrained to the vertical direction along the rod. Suitable air bag elements 154 are available from FIRESTONE INDUSTRIAL PRODUCTS, INC. (Nashville, Tenn., USA) as part number W01-358-7427. In some embodiments, each air bag element 154 is capable of generating a vertical force of at least 445 kN, or in some cases from 0 kN up to 445 kN.

As shown, the air bag column 106 includes three linked air bag elements 154a-c, however, it will be understood that more, or fewer, air bag elements may be provided. Each air bag element 154 is defined by a roughly toroid-shaped airtight cavity bounded by a gas impermeable material. As defined herein, toroid-shaped can include any suitable construction of an airtight cavity with a central hole through which the rod 114 can pass. According to certain embodiments, each air bag element 154 has an accordion-like wall shape that is operable to expand in a vertical direction when the air bag element is pressurized, and to collapse vertically when the air bag element is depressurized. According to some embodiments, the air bag elements 154 may be fluidly linked, so that pressurized gas added to one air bag element acts to pressurize all elements in the air bag column 106. However, in some cases, each air bag element 154 may be independently connected with a source of pressurized gas. In such cases, pressurized gas connections to each air bag element 154 may also be linked together. An example pneumatic system 110 for pressurizing the air bag column 106 and the rod lock assembly 108 is also shown.

The pneumatic system 110 as shown herein includes a pressure source 160, which can be a compressor, or may be a reservoir of pressurized gas which can be fed by a compressor. The pressure source 160 may be operable to take in external air 182 to use as a working gas. The pressure source 160 is operable connected with the air bag column 106 via a first valve 162 and with the rod lock assembly 108 by a second valve 172. The first and second valves 162, 172 are shown proximate to the respective assemblies to which they provide air for illustrative purposes only, and it will be understood that the valves may be located elsewhere, including integrated with the pressure source 160 or integrated with the air bag column 106 and rod lock assembly 108, respectively.

Both valves 162, 172 are preferably fed by the same pressure source 160, so that a pressure loss to one valve will coincide with a pressure loss at the other valve. According to some embodiments, the first valve 162 is connected with the pressure source 160 via a first valve inlet 166 and a first source line 170; while the second valve 172 is connected with the pressure source via a second valve inlet 178 and a second source line 180, the first and second source lines being in fluid communication. The first valve 162 is connected with the air bag column 106 via an air bag column inlet 164, and includes a first vent 168. The first valve 162 can operate as a three-way valve, capable of selectively connecting the pressure source 160 with the air bag column 106, or connecting the air bag column with the first vent 168. In operation, connecting the pressure source 160 with the air bag column 106 results in the inflation of the air bag column, raising the platform; while the release of pressure from the air bag column 106 via the first vent 168 results in a controlled release of air from the air bag column, which lowers the platform. According to various embodiments, the air bag column 106 can accommodate pressures in the range of 0 to 586 kPa, resulting in lifting forces of up to 32.1 kN. According to some specific embodiments, the air bag column 106 is operable to lift loads of at least 6.67 kN when pressurized. Specific lifting forces available can depend, in part, on the geometries and materials of the air bag elements 154 used in the air bag column 106. According to some embodiments, the air bag column elements 154 can be formed of any suitable high-strength flexible polymer, rubber, or steel reinforced rubber, and can have dimensions in the range of about 0.08 to about 0.75 meters in diameter, with heights of each air bag column element ranging from as little as 0.01 meters when depressurized, up to 30 meters or more when pressurized.

The second valve 172 is connected with the rod lock assembly 108 via the rod lock assembly inlet 174, and includes a second vent 176. The second valve 172 can operate as a three-way valve, capable of selectively directing pressure from the pressure source 160 to the rod lock clamping element 152, or venting pressure from the clamping element via the second vent 176. In operation, connecting the pressure source 160 with the clamping element 152 results in release of the clamping element. Releasing the clamping element 154 allows the rod lock assembly 108 to move freely along the vertical rod 114 while pressurized. When pressurization is lost, e.g. when the second valve 172 is used to vent pressure from the clamping element 154, or when pressure is lost due to a system failure (e.g., failure of the air bag column 106 or of the pressure source 160), the clamping element will engage, causing the rod lock assembly 108 to firmly grasp the vertical rod 114 and secure the platform 102 against vertical motion.

A control system 112, including a control element 184, can be operably connected to each of the first and second valves 162, 172, and with the pressure source 160, in order to selectively control whether each valve is open or closed, and the manner in which each valve directs pressure from the pressure source 160. The control element 184 can further include user input and/or sensing elements for controlling operation of the system 100, as discussed below with reference to FIGS. 5-7.

According to some embodiments, a hard stop mechanism may be employed to precisely limit the movement of the platform 102. For example, a one or more locking stops 190 can be added to any one, or more than one, of the stabilizing rails 130, 134, or optionally to the vertical rod 114. The locking stop 190 can be positioned prior to a lifting or lowering option in order to obstruct the motion of the platform at a particular height. Locking stops 190 can include a clamping mechanism that can be placed around a rail or rod and then tightened, preferably manually, to firmly clasp the rail or rod. In operation, locking stops 190 can be positioned on one one or both of the stabilizing rails 130, 134 to interfere with the linear bearings 142 when the stabilizing assembly 104 is moved by actuation of the platform 102. According to some embodiments, the locking stops 190 can be used to support the weight of the platform 102 and supported cargo by way of the stabilizing assembly 104. According to some additional embodiments, the locking stops 190 can be placed to limit upward movement of the platform 102.

Figure 2:
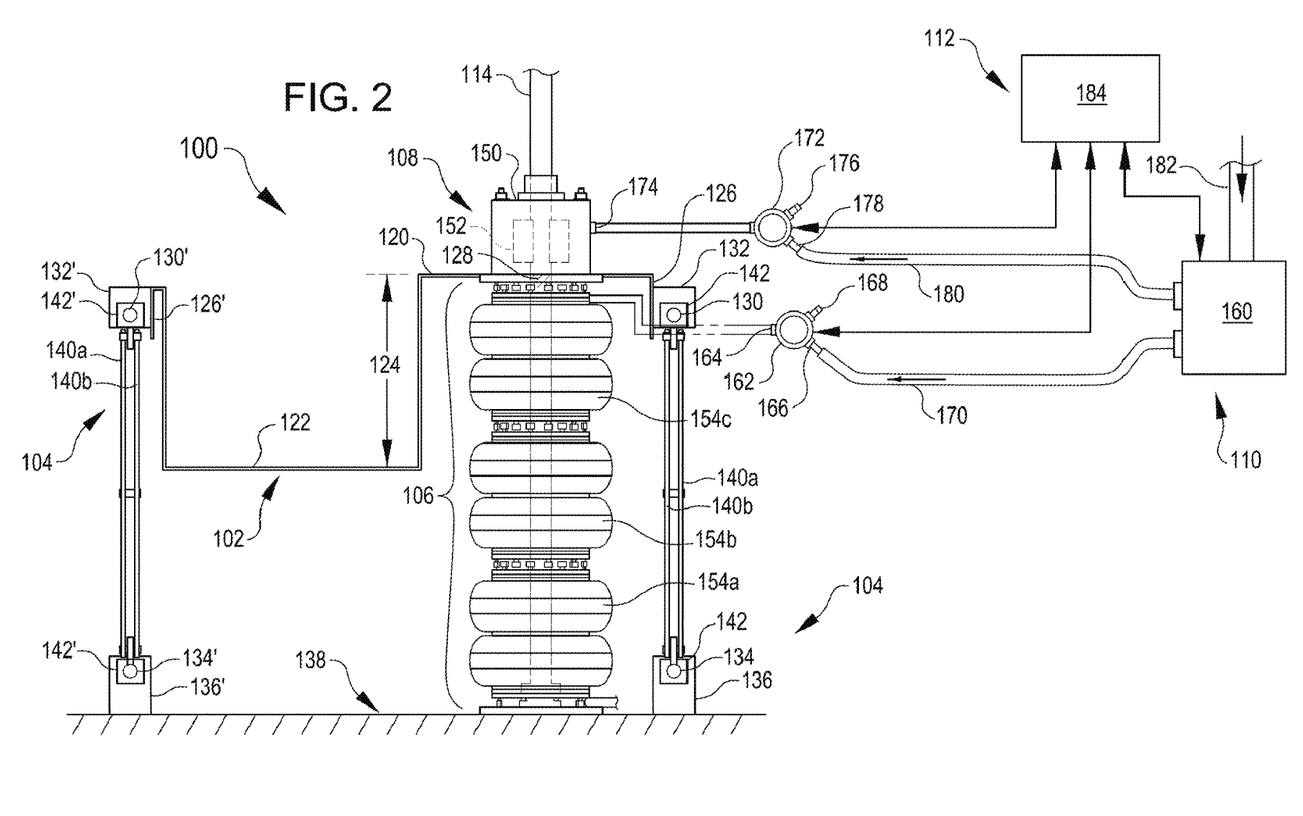
FIG. 2 shows the example air bag lifting system of FIG. 1 in a front view.

FIG. 2 shows the example air bag lifting system 100 of FIG. 1 in a front view, showing with greater detail an example configuration of the working portion 120 and platform bed 122, among other components. In particular, the stabilizing assembly 104 is shown including both a first, scissor-type arrangement of a pair of support members 140 and a second pair of support members 140', of the same type and positioned opposite the first pair across the platform 102. The second pair of support members 140' can be the same type as the first pair of support members 140, and are aligned with the first pair to aid in supporting and aligning the platform 102 in a horizontal orientation. Any suitable number of additional scissor-type support members can be positioned around other sides of the platform 102. In some cases, the first and second pairs of support members 140, 140' can be connected together to ensure that they actuate in concert when the platform 102 is raised and lowered. The second pair of support members 140' is connected with the platform 102 and the base 138 via similar connectors as the first pair of support members 140, including upper and lower stabilizing rails 130' and 134' connected, respectively, to upper rail connective elements 132' attached with a flange 142', and to lower rail connective elements 136' attached to the floor. The ends of the second pair of support members 140' can be slidingly connected with the upper and lower stabilizing rails 130', 134' via linear bearings 142' or the like.

The platform bed 122 as shown is positioned offset from the portion of the working portion 120 which connects with the rod lock 108 and air bag column 106, in accordance with embodiments. This offset configuration allows for a larger portion of the platform 102 to be used for the platform bed 122. However, it will be understood that the working portion 120 can occupy a different part of the platform 102 without deviating from the spirit of the disclosure. In some cases, the working portion 120 may be positioned centrally to the platform 102, or may be positioned at one end of the platform bed 122 rather than alongside the platform bed. In some alternative embodiments, the working portion 120 may be flush with the platform bed 102, in which case, the platform bed 122 may remain suspended off of the base 138 when the platform 102 is fully lowered. In other alternative embodiments, the air bag column 106 may be positioned in a depression of the base 138 (not shown), to reduce the amount of vertical clearance 124 needed between the working portion 120 and platform bed 122 in order to permit the platform bed 122 to rest on the base 138.

Figure 3:
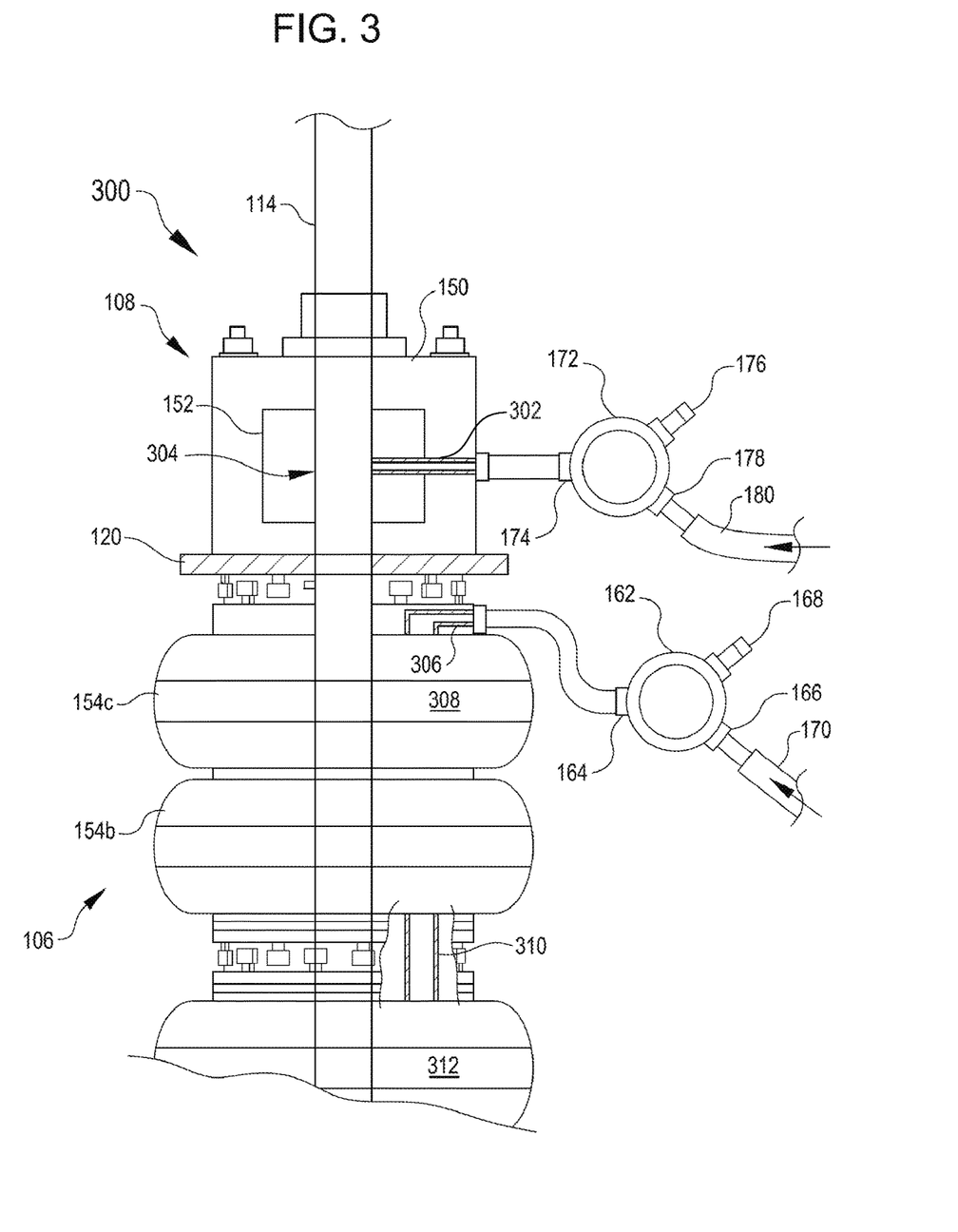
FIG. 3 shows a side section view of a portion of the example air bag lifting system of FIGS. 1 and 2, with attention to the compressed air valves of the rod lock and air bag assembly, in accordance with embodiments.

FIG. 3 shows a side section view of a portion of the example air bag lifting system 300 of FIGS. 1 and 2, with attention to the compressed air valves 162, 172 of the air bag column 106 and rod lock 108, in accordance with embodiments. The first air valve 162, to the air bag column 106, has an inlet 170 from the pressure source 160 (not shown), an air bag column inlet 164, and a first vent 168 which vents to the environment. The air bag column inlet 164 is connected with an air bag inlet port 306 which feeds pressurized air to a first air bag column element interior 308. In some embodiments, the first air bag column interior 308 is formed as an airtight, sealed annulus around the rod 114. When inflated with pressurized air from the first valve 162, the topmost air bag column element 154c expands; and similarly, when deflated, the air bag column element 154c contracts. The first air bag column interior 308 can be fluidly connected with a second air bag column element interior 312 of an intermediate air bag column element 154b, e.g. via an interior port 310, and so on with additional air bag column elements. In this configuration, each air bag column element 154 of the air bag column 106 can be inflated or deflated in concert under the control of the first valve 162 and pressure source 160. However, it will be understood that, in alternative embodiments, duplicate valves may be employed to connect the pressure source 160 individually to each air bag column element 154. Although the first valve 162 is shown connected with the topmost air bag element 154c of the air bag column 106, it will be understood that the first valve 162 can be instead connected with any other suitable air bag element 154 of the air bag column 106, such as a bottommost air bag element or an intermediate air bag element.

The topmost air bag element 154c is connected with the working portion 120 of the platform 102, immediately adjacent and opposite the rod lock 108 and at least partly encompassing the vertical rod 114, in accordance with embodiments. The rod lock casing 150 is connected with the working portion 120 and contains the clamping element 152, which at least partly encloses the vertical rod 114 and is operable to close on the vertical rod to firmly clamp the rod lock 108 to the rod, halting and/or preventing vertical movement of both the rod lock 108 and connected platform 102 relative to the vertical rod 114.

The rod lock 108 contains a passive locking mechanism which automatically causes the clamping element 152 to firmly clamp the vertical rod 114 when not actively disengaged by pneumatic pressure. Suitable passive locking mechanisms include, e.g., spring-loaded mechanisms, gravity-powered mechanisms, or the like, which can employ cam elements or other suitable means for mechanical advantage against the rod surface 304. The casing 150 contains a rod lock pneumatic conduit 302 which fluidly connects the clamping mechanism 152 with the rod lock assembly inlet 174 of the second valve 172. In operation, the second valve 172 directs pressurized gas from the pressure source 160 (not shown) from the second valve inlet 178 to the rod lock pneumatic conduit 302 via the rod lock assembly inlet 174. This applied positive pressure causes the clamping element 152 to disengage, allowing the rod lock 108 to slide freely up and down along the vertical rod 114. However, in the event that the rod lock pneumatic conduit 302 is depressurized, the clamping element 152 quickly clamps down on the vertical rod 114 and causes the rod lock 108 to firmly lock itself to the vertical rod. The rod lock pneumatic conduit 302 can be depressurized during a failure condition, e.g. when pressure is lost at the pressure source 160, or can be depressurized by venting the second valve, e.g. diverting gas from the rod lock assembly inlet 174 via the second valve vent 176.

Figure 4:
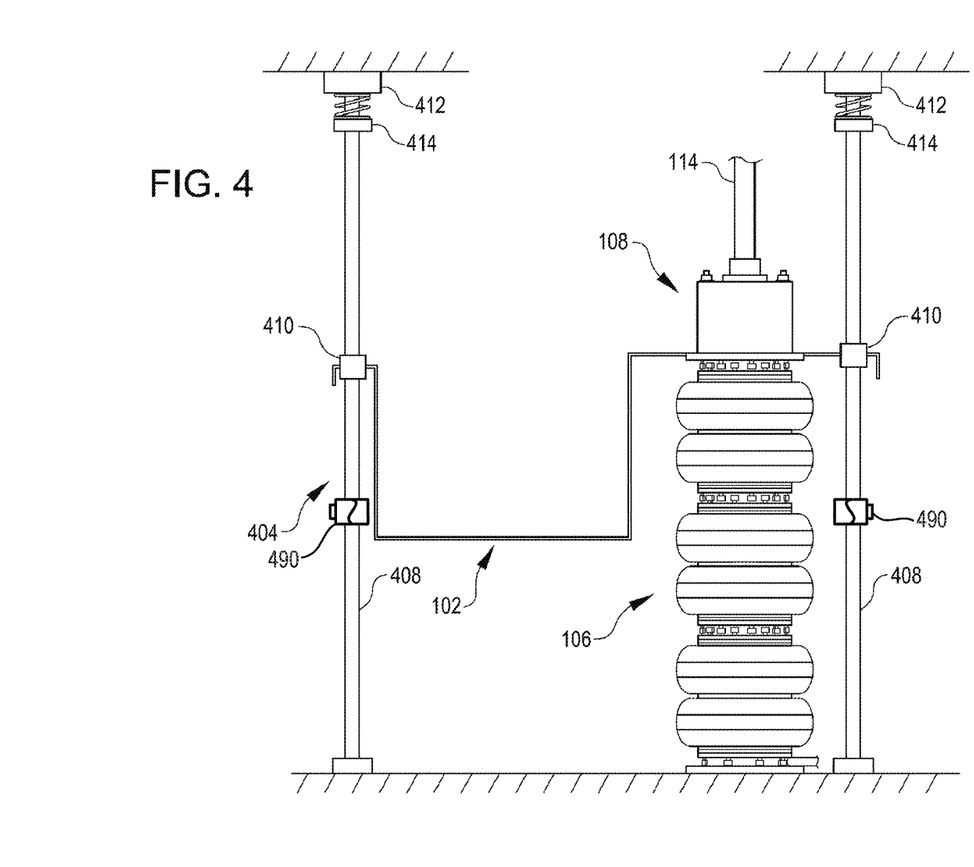
FIG. 4 shows a front view of a second air bag lifting system using an alternative support system, in accordance with embodiments.

FIG. 4 shows a front view of a second air bag lifting system 400 using an alternative support system 404, in accordance with embodiments. The second air bag lifting system 400 can incorporate any suitable combination or variation of the above-disclosed elements including, but not limited to, the platform 102, air bag column 106, rod lock assembly 108, and vertical rod 114. The alternative support system 404 is based one or more vertical support members 408 which can be positioned adjacent, or positioned to pass through, portions of the platform 102. FIG. 4 shows a pair of vertical support members 408 positioned at opposite sides of the platform 102, which connect between the base 138 and a pair of upper stops 412, which may descend from a ceiling, cage, or other fixed element above the platform. In some cases, the vertical support members 408 may connect directly with a ceiling, cage, or other fixed element. The platform 102 is connected with the vertical support members 408 by a set of linear bearings 410, which can be connected to sides or corners of the platform 102 or positioned within the platform. Preferably, the linear bearings 410 are located proximate to sides or corners of the platform, where they can support the platform against horizontal forces and act to maintain the platform in a horizontal orientation without impeding payload access to the platform. According to some embodiments, the vertical support members 408 can include elastic or sprung elements 414 to protect the upper stops 412 from damage due to overextension of the platform.

In alternative embodiments, an air bag lifting system can incorporate structural elements of either or both of the systems 100 and 400 disclosed in FIGS. 1-3 and 4, respectively. Furthermore, specific embodiments of air bag lifting systems can employ any suitable number of scissor-type and/or vertical support members. For example, certain alternative embodiments may employ a set of vertical support members (FIG. 4) at corners of a platform, and employ scissor-type support members (FIGS. 1-2) along two or more sides of the platform. Any suitable combination of vertical and scissor-type members, or other comparable support system, can be combined with various configurations a working portion 120 and platform bed 122. Furthermore, although embodiments described herein include only one air bag column 106 and rod lock assembly 108 per platform 102, alternative embodiments may employ multiple air bag columns and rod lock assemblies. In such cases, additional air bag columns and/or rod lock assemblies may be connected with the same pressure source 160.

According to some embodiments, a hard stop mechanism may be employed to precisely limit the movement of the platform 102 via the alternative stabilizing assembly 404. For example, a one or more locking stops 490 can be added to any one, or more than one, of the stabilizing rails 408. The locking stop 490 can be positioned prior to a lifting or lowering option in order to obstruct the motion of the platform 102 at a particular height. Locking stops 490 can include a clamping mechanism that can be placed around a rail or rod and then tightened, preferably manually, to firmly clasp the rail or rod. In operation, locking stops 490 can be positioned on one or both of the stabilizing rails 408 to interfere with the linear bearings 410 when the stabilizing assembly 404 is moved by actuation of the platform 102. According to some embodiments, the locking stops 490 can be used to support the weight of the platform 102 and supported cargo by way of the stabilizing assembly 404. According to some additional embodiments, the locking stops 490 can be placed to limit upward movement of the platform 102.

Figure 5:
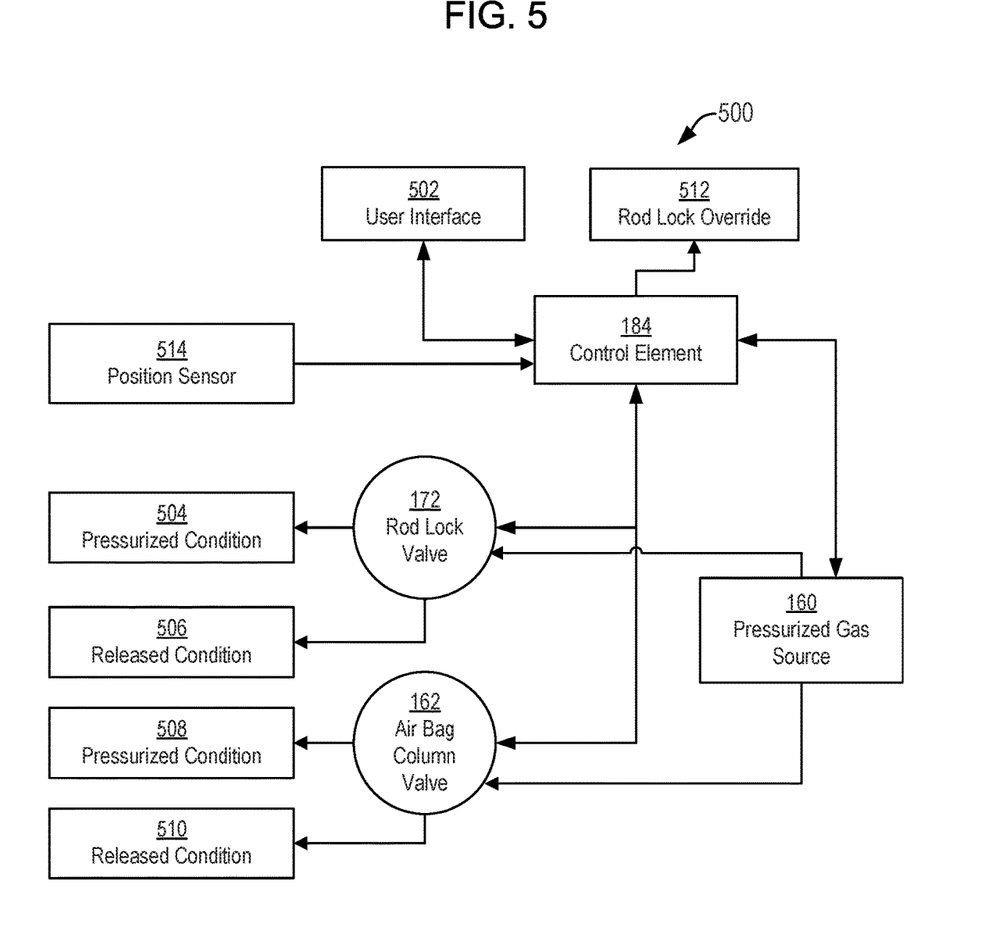
FIG. 5 shows an example control system for actuating an air bag lifting system, in accordance with embodiments.

FIG. 5 illustrates a block diagram of an example system 500 for controlling an air bag based lifting system, in accordance with embodiments. The system 500 may be operable to control any suitable lifting system such as lifting system 100 shown in FIGS. 1-3 or system 400 shown in FIG. 4.

The control system 500 can include any or all of, or any suitable combination of the following modules. A user interface 502 is operable to receive a user command, and in some cases to display information for the user. In some cases, the user interface 502 may operate at a low level, providing user access to adjust the properties of each valve of the system 500. In some alternative embodiments, the user interface 502 may be a computerized interface, which might receive and enact high-order commands, e.g. commands to raise a platform to a particular height. A control element 184 is operable to receive commands from the user interface 502 and communicate the commands to the individual modules of the system 500. According to some embodiments, the control element 184 can control the pressurized gas source 160, each of the first and second valves 162, 172, one or more sensors 514 for sensing the vertical height or position of a platform, and in some cases, an override 512 configured to actuate or release the rod lock 108 independent of whether the rod lock is pressurized, e.g. for installation or maintenance purposes.

The control element 184 can be operably connected with the various components of the system 500 including, but not limited to, the first and second rod lock valves 162, 172, the pressurized gas source 160, the override 512, and the height sensor 514. According to some embodiments, the control element 184 can include a computer containing a processor and non-volatile memory containing instructions that, when acted on by the processor, cause the system 500 to actuate a connected air bag lifting system.

According to one example, in a lifting configuration, the control element 184 can receive a command from the user interface 102 to lift a payload. The control element 184 can cause the rod lock valve 172 to assume a pressurized configuration 504 in which pressurized gas is provided to the rod lock assembly 108 (FIGS. 1-4) via the pressurized gas source 160, to release the rod lock assembly from the vertical rail 114 and allow vertical movement. Simultaneously, the control element 184 can cause the air bag column valve 162 to assume a pressurized configuration 508, in which pressurized gas is provided to the air bag column 106 (FIGS. 1-4) to inflate the air bag column and lift the platform 102 vertically. In the lifting configuration, pressurized air can be added to the system 500 by the pressurized gas source, which can include a compressor, a reservoir of compressed air, or other suitable pressurized gas source.

According to another example, in a lowering configuration, the control element 184 can receive a command from the user interface 102 to lower a payload. The control element 184 can cause the air bag column valve to vent air via the air bag column valve 162 assuming a released condition 510, in which pressurized air is bled from the valve and from the air bag column 106 (FIGS. 1-4) in a controlled manner. During a controlled release, the pressure at the air bag column 106 is reduced sufficient to lower the platform 102 (FIGS. 1-4) in a controlled manner, while pressure at the rod lock assembly 108 is sufficiently high to prevent clamping to the vertical rod 114. However, in the event that depressurization occurs rapidly at the air bag column valve 162, concomitant depressurization will occur at the rod lock valve 172, triggering a released condition 506 at the rod lock assembly 108 (FIGS. 1-4) as well, causing the system 500 to lock the rod lock in place on the vertical rail in a fail-safe mode. While in the lowering configuration, the system 500 can cause the pressurized gas source 160 to seal air into the system, so that lowering the air is removed only by controlled venting at the air bag column valve 162.

A sensor 514 can be employed to determine a lifting height of the platform 102, according to some embodiments. In some cases, the sensor 514 can detect displacement of the platform 102 relative to a starting or lowest position, and communicate displacement information to the control element 184, which can relay the information in readable form for a user via the user interface 502. In some embodiments, the system 500 can bring the platform 102 to a predetermined height by receiving input height information at the user interface 502, and then, via the control element 184, causing the platform to be raised or lowered to the input height. In some cases, it may be desirable to release the rod lock assembly 108 (FIGS. 1-4) via a rod lock override 512, which can include a secondary mechanism to release the rod lock assembly from the vertical rod 114 without necessitating pressurization of the rod lock assembly. For example, during service, maintenance, or installation of the system 500 it may be necessary to move the rod lock 108 along the vertical rod 114 (FIG. 1-4) without pressurizing the rod lock assembly. The system 500 can also engage the rod lock assembly 108 to the vertical rod 114 by depressurizing the rod lock assembly 108 in the released condition 506, e.g. by venting pressure from the rod lock assembly, which causes the rod lock assembly to clamp to the vertical rod, halting and preventing vertical motion of the platform 102.

Figure 6:
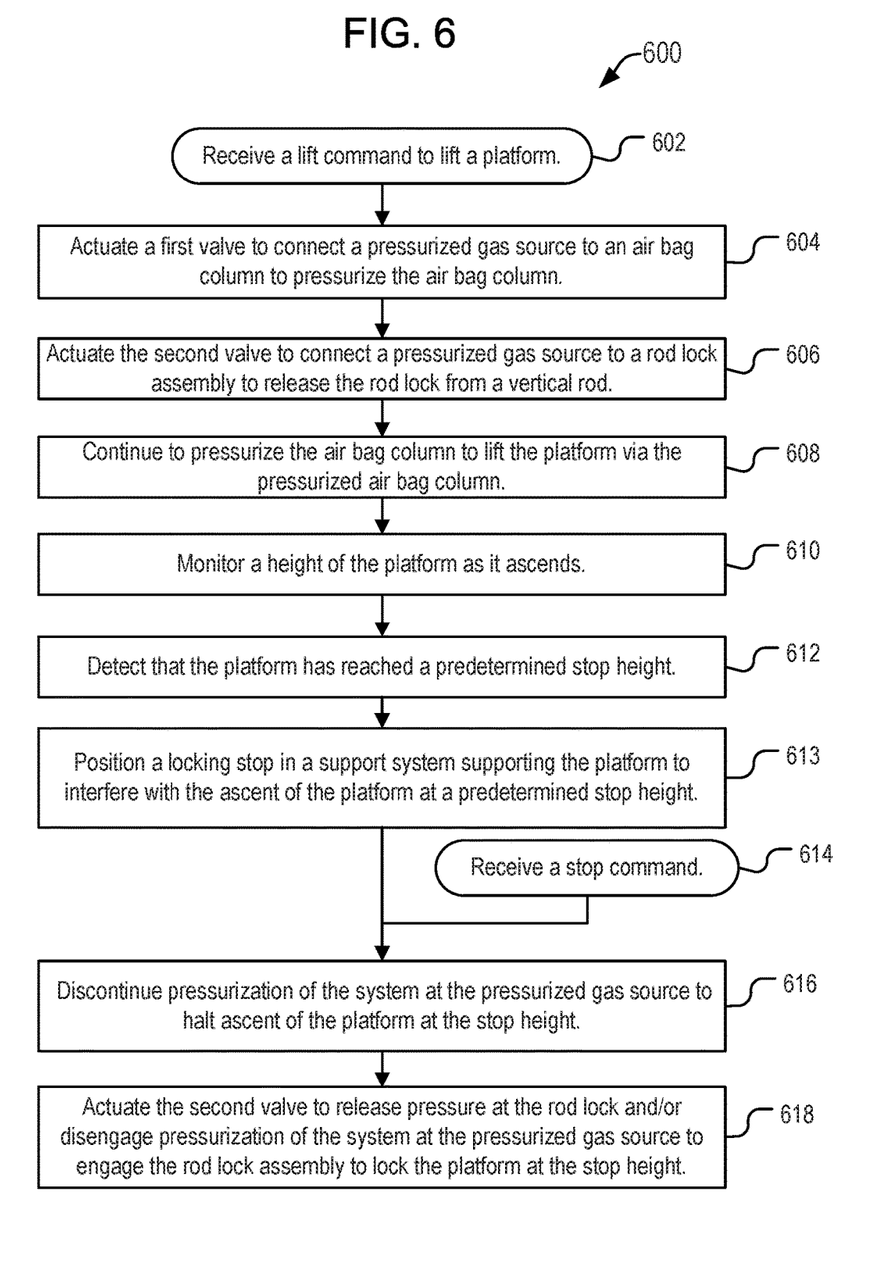
FIG. 6 illustrates an example process for lifting a platform with an air bag lifting system, in accordance with embodiments.

FIG. 6 illustrates an example process 600 for controlling an air bag based lifting system to lift a payload, in accordance with embodiments. Aspects of the process 600 may be performed, in some embodiments, by a similar system to the system 500 discussed with reference to FIG. 5. The system may be implemented by air bag based lifting systems such as systems 100, 400 discussed in FIGS. 1-4.

In accordance with embodiments, a lift command can be received at an air bag lifting system to lift a platform (act 602). In response, the system can actuate a first valve connected between a pressurized gas source and an air bag column to pressurize the air bag column (act 604). The system can actuate a second valve, connected between the pressurized gas source and rod lock assemblies, to pressurize the rod lock assembly and release the rod lock assembly from a vertical rod (act 606). As both valves are connected with the pressurized gas source, the rod lock assembly does not fully pressurize and disengage from the vertical rod unless and until the air bag column is sufficiently pressurized to support the platform. The platform can then be lifted via the pressurized air bag column as it is further pressurized (act 608). As pressurized gas is moved to the air bag assembly, the platform rises, during which time the displacement or height of the platform can be monitored (act 610).

In some embodiments, the platform's displacement can be monitored until the platform has reached a predetermined stop height (act 612). Alternatively, the platform can be stopped at a predetermined stop height by positioning a locking stop in a support system that supports the platform such that the locking stop interferes with motion of the platform beyond the stop height (act 613). Suitable locking stops include any suitable form of clamp that can be attached with a support system and limit the motion of sliding or otherwise moving parts in the support system. Alternatively, once a user has determined that the platform can be stopped at its current height, the user can input a stop command which his received by the system (act 614). When the stop command has been received, or when the platform has reached the predetermined height, the system can discontinue the pressurization of the air bag column to halt the ascent of the platform at the stop height (act 616), thus pausing the platform at a particular vertical position. Alternatively, the system can lock the platform to a particular vertical height by releasing pressure from the system via the pressurized gas source, or via the second valve at the rod lock assembly, in which case the rod lock assembly will engage and support the platform (act 618).

Figure 7:
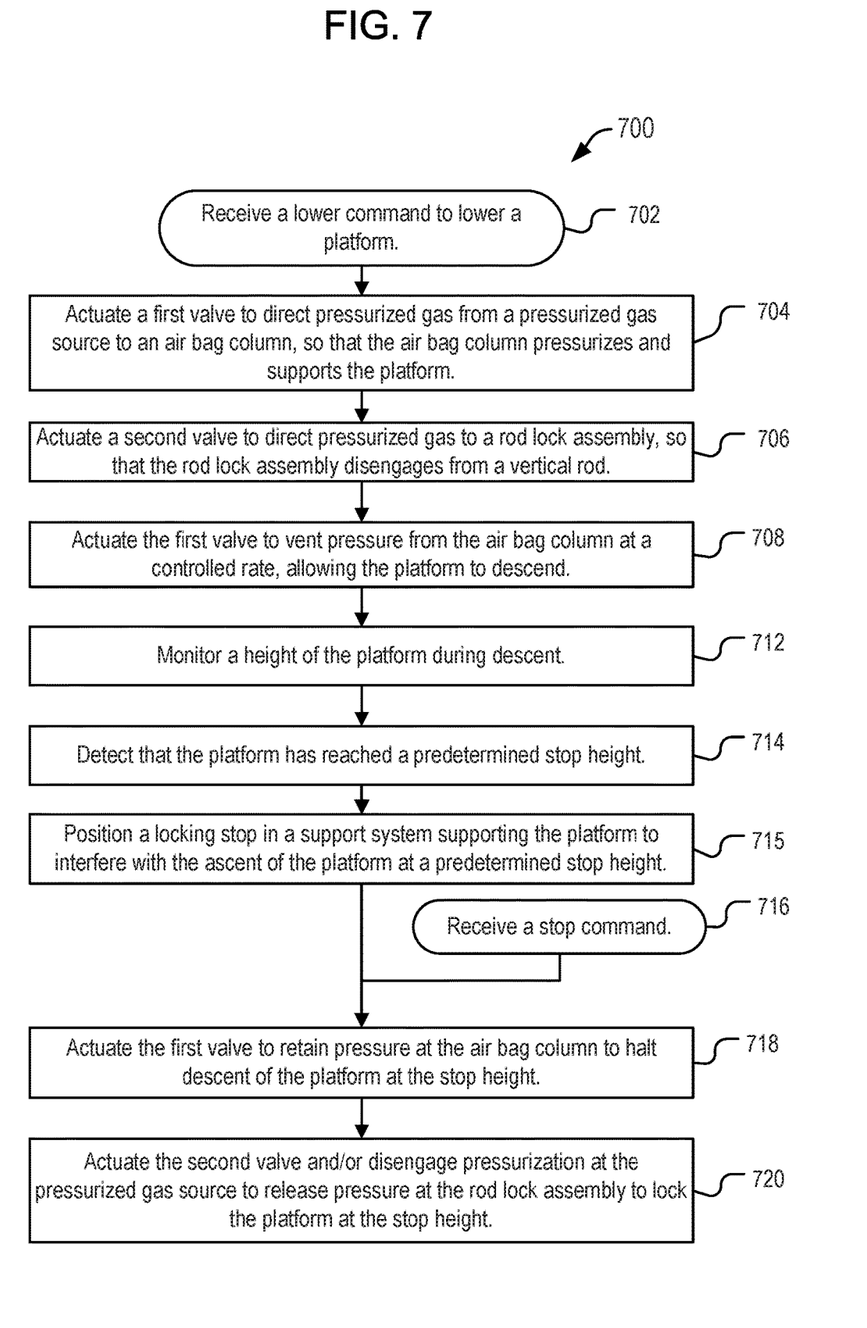
FIG. 7 illustrates an example process for lowering a platform with an air bag lifting system.

FIG. 7 illustrates an example process 700 for controlling an air bag based lifting system to lower a payload, in accordance with embodiments. Aspects of the process 700 may be performed, in some embodiments, by a similar system to system 500 discussed with reference to FIG. 5. The system may be implemented by air bag lifting systems such as systems 100, 400 discussed with reference to FIGS. 1-4.

In accordance with embodiments, a lower command can be received at the air bag based lifting system to lower a platform (act 702). In response, the system can actuate a first valve to direct pressurized gas from a pressurized gas source to an air bag column until the air bag column supports the platform (act 704). The system can actuate a second valve, connected between the pressurized gas source and a rod lock assembly, in order to disengage the rod lock assembly from a vertical rod, so that the platform can move freely (act 706). Notably, because the pressurized gas source is connected with both the first and second valves, the rod lock assembly will not disengage until the system is fully pressurized, meaning until the air bag column is sufficiently pressurized to support the platform.

When the platform is supported, the first valve can be vented in a controlled manner, to release gas from the air bag column, so that the platform descends at a controlled rate (act 708). Notably, the gas is vented at a controlled rate that falls below a threshold rate, where the threshold rate would impact the overall pressurization of the system below a threshold pressure required to disengage the rod lock assembly from the vertical rod. During the descent of the platform, the position or height of the platform can be monitored (act 712) until the system detects that the platform has reached a predetermined stop height (act 714). Alternatively, the platform can be stopped at a predetermined stop height by positioning a locking stop in a support system that supports the platform to interfere with the descent of the platform beyond the stop height (act 715). Suitable locking stops include any suitable form of clamp that can be attached with a support assembly and limit the motion of sliding or otherwise moving parts in the support system. In some cases, the platform may then be supported by one or more locking stops in the support system. In some cases, the system can proceed to lower the platform instead until a stop command is received (act 716). When the platform has reached the designated stop height, the first valve can be actuated to cause the air bag column to retain pressurization, in order to halt the descent of the platform at the stop height (act 718). Alternatively, or in addition, the second valve and/or the pressurized gas source can be vented to release pressure at the rod lock assembly (act 720).

In some embodiments, the processes and control systems described above may be implemented in a computer system, and implemented by a processor that executes instructions stored in nonvolatile memory. Storage media, computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An air bag based lifting system, comprising:
    a base;
    a platform;
    a vertical rod connected to the base and positioned to pass through or adjacent to the platform;
    a stabilizing mechanism connected with the platform and the base and operable to retain the platform in a horizontal orientation;
    an air bag column connected with the platform and the base, positioned beneath at least a working portion of the platform, and encompassing the vertical rod, the air bag column operable to support the platform when pressurized;
    a rod lock connected with the platform, the rod lock having a released configuration and a locked configuration, and the rod lock being operable to secure the platform in a vertical position with respect to the vertical rod when in the locked configuration and operable to slide freely along the vertical rod when in the released configuration, wherein the rod lock is in the locked configuration when unpressurized and in the released configuration when pressurized;
    a source of pressurized gas;
    a first valve mechanism operable to selectively connect the air bag column with the source of pressurized gas to pressurize the air bag column, or to vent the air bag column;
    a second valve mechanism operable to selectively connect the rod lock with the source of pressurized gas to pressurize the rod lock, or to vent the rod lock; and
    a control mechanism operable to selectively actuate the first valve and operable to selectively actuate the second valve.

2. The system of claim 1, wherein the first valve mechanism and the second valve mechanism are fluidly connected via the source of pressurized gas such that, when any one of the first valve mechanism, second valve mechanism, or source of pressurized gas is depressurized, both of the first and second valve mechanisms are depressurized.

3. The system of claim 1, wherein the control mechanism further comprises a processor and memory containing executable instructions that, when executed by the processor, cause the control mechanism to, at least:
    cause the first valve mechanism to connect the air bag column with the source of pressurized gas to pressurize the air bag column;
    cause the second valve mechanism to connect the rod lock with the source of pressurized gas to pressurize the rod lock, such that the platform is raised via the air bag column.

4. The system of claim 3, further comprising a sensor connected with the platform and operable to determine a position of the platform, and wherein the control mechanism is further configured to:
    detect, via the sensor, that the platform has been raised to a target height; and
    cause the source of pressurized gas, to stop pressurizing the air bag column, such that the platform stops rising at the target height.

5. The system of claim 3, further comprising a sensor connected with the platform and operable to determine a position of the platform, and wherein the control mechanism is further configured to:
    detect, via the sensor, that the platform has been raised to a target height; and
    cause one of the first valve, second valve, or source of pressurized gas to depressurize, such that the rod lock is depressurized, causing the rod lock to assume the locked configuration when the platform is at the target height.

6. The system of claim 1, wherein the control mechanism further comprises a processor and memory containing executable instructions that, when executed by the processor, cause the control mechanism to, at least:
    cause the first valve mechanism to vent the air bag column at a controlled rate to depressurize the air bag column and allow the platform to descend;
    cause the second valve mechanism to connect the rod lock with the source of pressurized gas to pressurize the rod lock, such that the rod lock remains sufficiently pressurized to retain the rod lock in the released configuration while the first valve mechanism vents the air bag column.

7. The system of claim 1, wherein the control mechanism is further configured to:
    receive a command to lock the platform; and in response to receiving the command, cause one of the first valve, second valve, or source of pressurized gas to depressurize, such that the rod lock is depressurized, causing the rod lock to assume the locked configuration.

8. An air bag based lifting apparatus, comprising:
a platform;
a vertical rod positioned to pass through or adjacent to the platform;
a stabilizing mechanism connected with the platform and operable to retain the platform in a horizontal orientation;
an air bag column connected with the platform and configured to retain the vertical rod, the air bag column operable to support the platform when pressurized;
a rod lock connected with the platform, the rod lock having a released configuration and a locked configuration, and the rod lock being operable to secure the platform in a vertical position with respect to the vertical rod when in the locked configuration and operable to slide freely along the vertical rod when in the released configuration, wherein the rod lock is in the locked configuration when unpressurized and in the released configuration when pressurized; and
a pneumatic system for pressurizing the lock and for selectively adding gas to or venting gas from the air bag column to raise or lower the platform, respectively, the pneumatic system comprising:
    a first valve mechanism operable to selectively connect the air bag column with a source of pressurized gas to pressurize the air bag column, or to vent the air bag column; and
    a second valve mechanism operable to selectively connect the rod lock with the source of pressurized gas to pressurize the rod lock, or to vent the rod lock.

9. The apparatus of claim 8, wherein the first valve mechanism and second valve mechanism are fluidly connected with each other such that, when one of the first or second valve mechanisms undergoes first pressure drop, the other of the first and second valve mechanisms undergoes a second pressure drop.

10. The apparatus of claim 8, wherein the platform comprises a working portion and a bed portion, the working portion being connected with the air bag column and with the rod lock, and the bed portion comprising a substantially flat element configured to hold a payload.

11. The apparatus of claim 10, wherein the working portion of the platform is positioned offset from the bed portion by a vertical clearance, the vertical clearance being sufficient to accommodate the air bag column underneath the working portion when the platform is positioned at a minimum height.

12. The apparatus of claim 8, wherein:
the stabilizing mechanism comprises a pair of support members connected together and arranged in a scissor-type arrangement, and connected with a base beneath the platform;
at least a first one of the pair of support members is slidingly connected in a horizontal direction with the platform; and
at least a second one of the pair of support members is slidingly connected in the horizontal direction with a base beneath the platform.

13. The apparatus of claim 8, wherein:
the stabilizing mechanism comprises at least two vertical members connected with a base beneath the platform and rigid against horizontal force, and the platform is slidingly connected with the at least two vertical members via at least two respective linear bearings.

14. The apparatus of claim 8, wherein the air bag column comprises a plurality of air bags arranged vertically and connected to each other, each air bag of the plurality of air bags comprising an airtight toroidal cavity configured to be arranged annularly around the vertical rod, wherein each air bag of the plurality of air bags is operable to expand in a vertical direction when pressurized and to collapse in the vertical direction when depressurized.

15. The apparatus of claim 14, wherein each air bag of the plurality of air bags is fluidly connected with each other air bag of the plurality of air bags by one or more interior ports, such that each air bag of the plurality of air bags comprising the air bag column expands when any one of the plurality of air bags is pressurized.

16. The apparatus of claim 8, wherein the air bag column is operable to accommodate pressurization in the range of 0 kPa to 586 kPa and operable to lift a load of at least 6.67 kN when pressurized.

17. A method of lifting a payload using an air bag based lifting apparatus, the method comprising:
with an air bag lifting apparatus comprising:
    a platform;
    a stabilizing mechanism connected with the platform and operable to retain the platform in a horizontal orientation;
    an air bag column connected with the platform and configured to retain a vertical rod passing through or adjacent the air bag column, the air bag column operable to support the platform when pressurized;
    a rod lock connected with the platform, the rod lock having a released configuration and a locked configuration, and the rod lock being operable to secure the platform in a vertical position with respect to the vertical rod when in the locked configuration and operable to slide freely along the vertical rod when in the released configuration, wherein the rod lock is in the locked configuration when unpressurized and in the released configuration when pressurized;
    a first valve mechanism operable to selectively connect the air bag column with a source of pressurized gas to pressurize the air bag column, or to vent the air bag column; and
    a second valve mechanism operable to selectively connect the rod lock with the source of pressurized gas to pressurize the rod lock, or to vent the rod lock;
pressurizing the air bag column by causing the first valve mechanism to connect the air bag column with the source of pressurized gas;
disengaging the rod lock to the unlocked configuration by causing the second valve mechanism to connect the rod lock with the source of pressurized gas to pressurize the rod lock; and
lifting a payload on the platform via the pressurized air bag column.

18. The method of claim 17, further comprising:
lowering the payload on the platform by causing the first valve mechanism to vent the air bag column at a controlled rate, the controlled rate being below a threshold rate that would otherwise depressurize the rod lock.

19. The method of claim 17, further comprising:
with the first and second valves actuated to connect the air bag column and the rod lock to the source of pressurized gas, retaining the source of pressurized gas, the air bag column, and the rod lock at a constant pressure such that the air bag column supports the platform.

20. The method of claim 17, further comprising:

venting one of the first and second valves or the source of pressurized gas to depressurize the rod lock, such that the rod lock engages the vertical rod in the locked configuration and supports the platform.

21. The method of claim 17, wherein the stabilizing mechanism comprises a stabilizing rail and a linear bearing configured to move along the stabilizing rail when the platform is raised or lowered, and further comprising:

attaching a locking stop at a first position along the stabilizing rail corresponding to a stop height of the platform such that the locking stop interferes with motion of the linear bearing along the stabilizing rail to prevent the platform from ascending or descending through the stop height.

\* \* \* \* \*

UNITED STATES PATENT AND TRADEMARK OFFICE
CERTIFICATE OF CORRECTION

PATENT NO.         : 10,384,506 B1
APPLICATION NO.    : 15/607034
DATED              : August 20, 2019
INVENTOR(S)        : David Lyle Woods and Jon Joseph Varteresian It is certified that error appears in the above-identified patent and that said Letters Patent is hereby corrected as shown below:

On the Title Page

Item (54) and in the Specification, Column 1, Lines 1-2:
Delete: "ROD-LOCK ENABLE AIR BAG LIFTING SYSTEM"
Insert: --ROD-LOCK ENABLED AIR BAG LIFTING SYSTEM--

Signed and Sealed this
Twenty-second Day of October, 2019

Andrei Iancu
*Director of the United States Patent and Trademark Office*